Patented May 15, 1923.

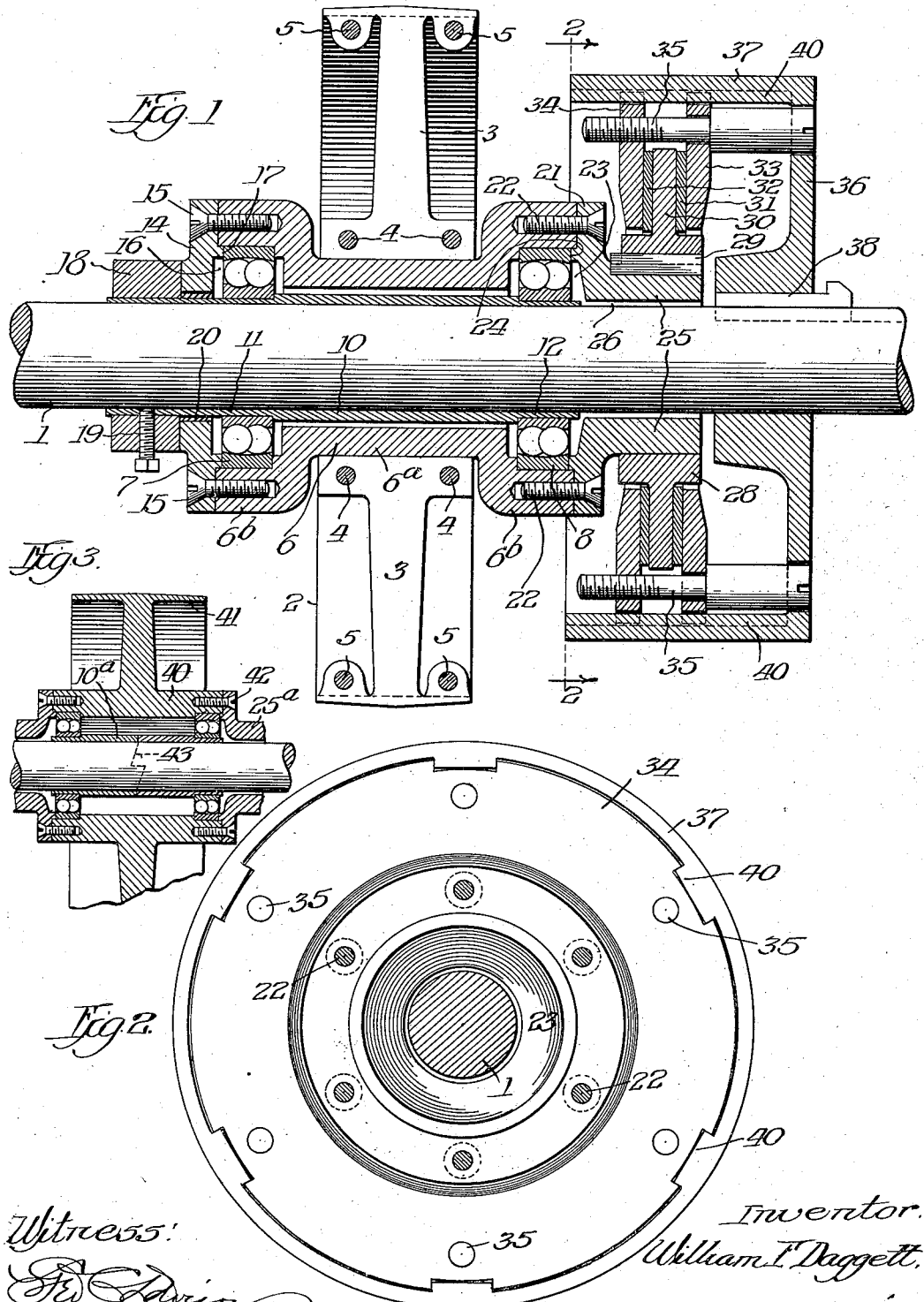

1,455,479

UNITED STATES PATENT OFFICE.

WILLIAM F. DAGGETT, OF CHICAGO, ILLINOIS.

PULLEY AND SIMILAR CONSTRUCTION.

Application filed October 14, 1920. Serial No. 416,895.

*To all whom it may concern:*

Be it known that I, WILLIAM F. DAGGETT, a citizen of the United States, residing at Chicago, in the county of Cook and State of Illinois, have invented a certain new and useful Improvement in Pulley and Similar Constructions, of which the following is a full, clear, concise, and exact description, reference being had to the accompanying drawings, forming a part of this specification.

My invention relates to pulley and similar constructions.

One object of the present invention is to provide a simple, practical and efficient device of the class specified.

Another object of this invention is to provide a novel and improved pulley construction and mounting hub structure therefor, in combination with novel and simple means for associating supplemental devices with the pulley, such as a friction clutch device or the like.

Another object of the invention is to secure such combination or association in a simple and practical manner, without the need of additional parts, or cumbersome or complicated constructions.

In the accompanying drawing Fig. 1 is a longitudinal section of a pulley device embodying my invention, together with a friction drive associated therewith;

Fig. 2 is a cross section taken on line 2—2 in Fig. 1.

Fig. 3 is a vertical section of a modified form of device.

Referring to the drawings, and particularly to Figs. 1 and 2, I show a rotary shaft 1 which is understood to be a driving or other shaft on which is mounted a pulley construction embodying my present invention. The pulley construction shown in said Figs. comprises a pulley rim 2 carrying spokes 3—3, the pulley wheel thus formed being preferably split with its halves secured together by means of bolts 4—4 and 5—5. This pulley wheel is mounted upon a central hub arrangement comprising a tubular hub member 6, the central portion 6ª of which is of less diameter than the end portion 6ᵇ. The latter portions 6ᵇ form enlargements of said hub 6, the pulley wheel being mounted on said central relatively small portion 6ª and held against end removal by the enlarged end 6ᵇ.

The hub member 6 is mounted upon or provided with ball bearings 7 and 8, which ball bearings are located substantially at the opposite ends of the member 6 and comprise inner and outer ball races with intervening balls, the same being arranged within the enlarged end hub portions 6ᵇ. A central sleeve 10 having reduced end portions 11 and 12 is arranged within the hub member 6 and over the rotary shaft 1, said sleeve 10 fitting tightly on the shaft 1 and its reduced end portions 11 and 12 fitting within and serving as supports or holders for the inner ball races of the ball bearings 7 and 8. Thus the pulley construction involves a split pulley and a hub to which said split pulley can be applied and from which it can be removed, together with ball bearings by which the pulley may be rotated without having such bearings mounted upon or directly associated or connected with the rotary shaft carrying pulley.

At one side or end of the hub member 6 is an end plate or member 14 which is secured to the adjacent enlarged end 6ᵇ by means of screws 15. This member 14 closes the chamber 16 containing the ball bearing 7 and is preferably provided with inwardly projecting shoulders 17 which fit against the outer ball race of the bearing 7 and so serve to hold the same in position. A ring 18 fits over the reduced end 11 of the sleeve 10 at the outer end of said member 14 and said ring 18 is provided with a set screw 19 which is arranged to pass through the sleeve end 11 and engage the shaft 1 and thereby hold the sleeve 10 firmly in position on said shaft 1. As a preferred arrangement the ring 18 is provided with a laterally extending portion 20 which fits in a corresponding recess in the member 14.

At the other end of the hub member 6 an end member 21 is provided and this is preferably secured to the adjacent enlarged end 6ᵇ by means of screws 22. This member 21 is similar to the member 14 in that it serves as a closure for the space or chamber 23 containing the ball bearing 8 and is provided with an inwardly extending annular shoulder or rib 24 which fits against the outer ball race of the bearing 8 and so holds the same in position. Said member 21, however, has a portion 25 which extends longitudinally of the shaft 1 and has a bore 26 somewhat larger than the shaft 1, so that said member 25 is free to rotate around the shaft 1 without touching the same. This extension 25 is adapted for use for various purposes, particularly for permitting another device of some sort to be combined with the pulley construction. For example, I show a friction drive arrangement mounted upon the extension 25 so that the device as a whole will comprise not only a pulley but a combined pulley and friction drive.

In this construction a hub member 28 is mounted upon the extension 25 and arranged to rotate therewith by means of a key 29. The member 28 is provided with a disc 30, on the opposite sides of which are friction discs 31 and 32. Other discs 33 and 34 are arranged on the outer sides of the discs 31 and 32 and screws 35 are passed through the discs 33 and 34 so as to hold said discs together, and said screws 35 may be adjusted so as to bring about any desired degree of frictional engagement or pressure between the discs 30, 31, 32, 33 and 34. A pulley member 36 having a rim 37 is mounted on the shaft 1, being splined to the same by key 38. The rim 37 is provided with projections 40 which fit in corresponding grooves or recesses in the discs 33 and 34, so that said rim 37 will rotate with the remaining part of the structure but at the same time will permit adjustment of the discs 33 and 34 by means of the screws 35. Thus the friction drive is combined with the pulley previously described and the extension 25 serves as the hub or a portion of the hub of the same.

In the construction shown in Fig. 3, I illustrate a pulley cast in one piece, instead of a split pulley, as shown in Figs. 1 and 2. This cast pulley has a hub 40 and a rim 41, made integral therewith, preferably by casting, and the extension 25ª, similar to the extension 25 is secured to the hub 40 by screws 42. As a preferred arrangement, a sleeve 10ª, similar to the sleeve 10 is provided, and is transversely split or divided, as at 43, so that the opposite parts or halves may be slipped on the rotary shaft from opposite sides, thereby facilitating assemblage and disassemblage.

It will be understood that other devices may be combined with the pulley by the use of the extension or member 25 in connection with such other devices, and also that other changes and modifications may be made without departing from the spirit of the invention.

What I claim as my invention is:

1. A device of the class specified comprising a tubular hub member carrying a pulley and provided with anti-friction bearing devices, an extension at one side of said hub member, said extension extending lengthwise of the shaft on which the device is mounted but fitted loosely over the same, and a supplemental device mounted on said shaft, said extension forming a portion of the hub of said supplemental device.

2. A device of the class specified comprising a tubular hub member carrying a pulley and provided with anti-friction bearing devices, an extension at one side of said hub member, said extension extending lengthwise of the shaft on which the device is mounted but fitted loosely over the same, and a friction driving device having a portion fixedly mounted on said shaft and adapted to utilize said extension as a portion of its hub.

3. A device of the class specified comprising a tubular hub member having its ends provided with anti-friction bearing devices, a shaft, a sleeve within said tubular member fixedly secured to said shaft, said sleeve being inserted within and serving as a support for said bearing devices, means for closing the chambers containing said bearing devices and an extension on said hub member extending lengthwise of the shaft on which said hub member is mounted.

4. A device of the class specified comprising a continuous tubular hub member having its ends provided with chambers containing anti-friction bearing devices, a sleeve within said tubular member, said sleeve being inserted within and serving as a support for said bearing devices, means for closing the chambers containing said bearing devices, and an extension on said hub member extending lengthwise of the shaft on which said hub member is mounted, said extension being formed as part of the means for closing one of the spaces or chambers containing said anti-friction devices.

5. A device of the class specified comprising a tubular hub member, anti-friction bearing devices arranged within the ends of said tubular member, a sleeve on which said bearing devices are mounted, a pulley on said hub member, a tubular extension at one end of said hub member, and a supplemental device mounted jointly on said shaft and on said extension.

6. A device of the class specified comprising a pulley device having a central hub member provided with enlarged ends, a split pulley mounted on the central part of said hub device, ball bearings within the enlarged ends of said hub member, a sleeve within said hub member and having reduced ends on which the ball bearings are mounted, closures for the opposite ends of said hub member, said closures being secured to the hub member by screws and one of said closures having an extension extending longitudinally of the rotary shaft on which the device is mounted, said extension having a bore of greater diameter than said shaft, a supplemental device mounted on said extension, and a collar provided with an adjustable screw to secure said inner sleeve to said shaft, said supplemental device comprising a friction drive having friction members mounted on said extension and keyed thereto and a rim member mounted on the shaft and keyed to the same.

7. A device of the class specified, comprising a tubular hub member carrying a pulley and provided with anti-friction bearing devices, an extension at one side of said hub member, said extension extending lengthwise of the shaft on which the device is mounted but fitted loosely over the same, and a supplemental device having a hub portion fixedly mounted on said shaft, and said extension forming an additional hub for said supplemental device.

8. In combination, a rotary shaft, a sleeve fixedly supported on said shaft, a hub embracing said shaft and sleeve and in spaced relation to the latter, enlarged ends on said hub, ball bearings in said enlarged ends supported thereby and by said sleeve, means for retaining the bearings against longitudinal displacement, a supplemental device having one portion fixedly secured to said shaft and another portion adapted for relative movement, and a longitudinal extension formed on said retaining means and embracing but spaced from the shaft and supporting the relatively movable portion of said supplemental device.

9. In combination, a shaft, a hub surrounding but spaced from said shaft, a sleeve fixedly secured to the shaft within said hub, said hub having enlarged end chambers, ball bearings in said chambers and supported on said sleeve, a supplemental device having fixed connection to the shaft, and means for retaining said bearings, said means having a longitudinal extension thereon affording a support for a part of said supplemental device.

In witness whereof, I hereunto subscribe my name this 8th day of October, A. D., 1920.

WILLIAM F. DAGGETT.